(12) United States Patent
Eckersten et al.

(10) Patent No.: US 6,377,205 B1
(45) Date of Patent: Apr. 23, 2002

(54) METHOD AND DEVICE FOR CLASSIFYING OVERHEAD OBJECTS

(75) Inventors: Christer Eckersten, Järfälla; Magnus Kamel, Stockholm, both of (SE)

(73) Assignee: Celsiustech Electronics A.B., Jarfalla (SE)

( * ) Notice: Subject to any disclaimer, the term of this patent is extended or adjusted under 35 U.S.C. 154(b) by 0 days.

(21) Appl. No.: 09/554,742

(22) PCT Filed: Nov. 20, 1998

(86) PCT No.: PCT/SE98/02104

§ 371 Date: Jul. 13, 2000

§ 102(e) Date: Jul. 13, 2000

(30) Foreign Application Priority Data

Nov. 21, 1997 (SE) .............................................. 9704277

(51) Int. Cl.$^7$ ............................................. G01S 13/93
(52) U.S. Cl. .............................. 342/90; 342/70; 342/27
(58) Field of Search .............................. 342/70, 71, 72, 342/90, 195, 27; 340/905, 907, 917, 933, 943, 946; 701/117, 119

(56) References Cited

U.S. PATENT DOCUMENTS

| | | | | |
|---|---|---|---|---|
| 3,978,481 A | * | 8/1976 | Angwin et al. ............... | 342/59 |
| 4,477,184 A | * | 10/1984 | Endo ......................... | 356/141.1 |
| 5,359,403 A | * | 10/1994 | Grosmann et al. ............. | 356/5 |
| 5,635,844 A | | 6/1997 | Takigawa et al. ............ | 324/642 |
| 6,204,778 B1 | * | 3/2001 | Bergan et al. .............. | 340/936 |
| 6,263,282 B1 | * | 7/2001 | Vallancourt ................. | 701/301 |

FOREIGN PATENT DOCUMENTS

| | | | | |
|---|---|---|---|---|
| EP | 0 627 634 A2 | | 12/1994 | ........... G01S/13/93 |
| SE | WO-0075686 A1 | * | 12/2000 | ............. G01S/7/40 |

* cited by examiner

*Primary Examiner*—John B. Sotomayor
(74) *Attorney, Agent, or Firm*—Connolly Bove Lodge & Hutz LLP

(57) ABSTRACT

The present invention relates to a method for classifying objects detected by a vehicle mounted radar located in front of said vehicle for transmitting a radar microwave signal and for receiving reflexes thereof from objects positioned in front of said vehicle, said melted comprising the steps of: tracking a radar reflex from an object located in front of said vehicle as the calculated distance from said vehicle to said object, as derived based upon the time of flight of said radar reflex, decreases; monitoring changes in the amplitude of said radar reflex from said object is said calculated distance from said vehicle to said object decreases; and classifying said object as an overhead object or a ground level object based upon the said changes in the radar reflex amplitude.

13 Claims, 6 Drawing Sheets

METHOD AND DEVICE FOR CLASSIFYING OVERHEAD OBJECTS

TECHNICAL FIELD OF INVENTION

The present invention relates to a method for classifying objects detected by a vehicle mounted radar located in front of said vehicle for transmitting a radar microwave signal and for receiving reflexes thereof from objects positioned in front of said vehicle. The invention also relates to a corresponding device for performing said method.

TECHNICAL BACKGROUND

Radar systems mounted on vehicles such as oars, buses, lorries and the like are today being developed. Such systems aim to support the driver of a vehicle by providing features such as cruise control, collision warning and collision avoidance based upon the detection of vehicles, obstacles and other objects in front of the vehicle.

A problem in such a vehicle mounted radar is to distinguish "harmless" overhead objects in front of the vehicle, such as overhead road signs and overhead bridges crossing the travel path of the vehicle, from ground level objects, such as cars, sideway barriers and other obstacles in front of the vehicle which the vehicle must stay clear of in order to avoid collision. As is understood, the terms ground level and overhead are used herein to define the level at which the vehicle is traveling and a level lying sufficiently above said ground level, as compared to the height of a vehicle, to avoid collision, respectively.

In horizontally scanning vehicle radars according to prior art, which does not provide elevation resolution, the approach to solve this problem has been to use a vertically very narrow radar beam. The vertical beam width is then simply chosen small enough to make overhead objects fall outside the beam envelope and thus not giving rise to any reflexions. However, the use of a very narrow beam has the disadvantage that the beam may be point in a to high or to low direction when the road is undulated or when the vehicle is heavily loaded.

OBJECT OF THE INVENTION

An object of the invention is to provide a reliable, cost effeicient and uncomplicated way of distinguishing overhead objects from ground level objects.

SUMMARY OF THE INVENTION

According to the present invention, said object is achieved by a method of the kind mentioned in the introduction, comprising the steps of: tracking a radar reflex from an object located in front of said vehicle as the calculated distance from said vehicle to said object, as derived based upon the time of flight of said radar reflex, decreases; monitoring changes in the amplitude of said radar reflex from said object as said calculated distance from said vehicle to said object decreases; and classifying said object as an overhead object or a ground level object based upon the said changes in the radar reflex amplitude.

The invention is based upon the inside that, as the vehicle approaches an object in front, the amplitude of the radar reflex or echo from said object will show different characteristics based upon whether or not the object is a ground level object or an overhead object. Detection of these different behaviors may thus be used to correspondingly classifying the object sa a hazard or not.

According to an embodiment of the invention, the classification of an object is based upon whether or not a decrease in the monitored amplitude, occuring as the distance between said vehicle and said object decreases, is larger than a predefined amplitude drop. This embodiment is thus based upon the insight that, as the vehicle approaches an object in front, an overhead object will gradually move away from the center of the radar beam, thus gradually reflecting lesser and lesser of the radar beam back to the vehicle, resulting in a decreasing amplitude, whereas a ground level object in front of the vehicle will essentially remain more or less close to the center of the beam and hence show a non-decreasing reflex.

Preferably, the currently received reflex amplitude is compared to an average amplitude value, as averaged during a decrease in the distance between said vehicle and said object. The classification of the object as an overhead object is than made if the difference between the current value and the average value is larger than a predefined amplitude difference.

According to a second embodiment of the invention, the classification of an object is based upon the tracking of a multipath effect associated with said object reflex. As a radar signal is transmitted towards and reflected from an object, the signal may use two different travel paths. One path is the straight line between the vehicle radar and the object. The other path uses the road as a reflecting surface, whereby the signal travels downwards in a first direction and is reflected against the surface of the road to then travel upwards in a second direction to reach the target. Depending on the difference in travel distance between the two paths, reflexes associated with the different paths will interfere with each other in a destructive or non destructive manner.

As the vehicle approaches an object in front of the vehicle, the multipath effect will provide an alternatively destructive and non destructive interference, thus giving rise to a corresponding alternately decreasing and increasing amplitude of said reflex.

As will be discussed more fully below the reference to the accompanying drawings, the period (i.e. period as calculated in the distance between the vehicle and the object) of said alternately incresing and decreasing amplitude will depend upon the objects altitude above the read surface. At any given range in the distance between the vehicle and an object, a reflex from a ground level object will show a greater distance between amplitude dips, i.e. will fluctuate more slowly, whereas a reflex from an overhead object will show a shorter distance between the amplitude dips, i.e. will fluctuate more rapidly. According to the second embodiment, the object is classified as an overhead object or a ground level object based upon the detected period or space frequency of the periodic variation in the amplitude.

Preferably, in this second embodiment, said object is classified as an overhead object based upon whether or not the variance of the received reflex amplitude, preferably normalized using the mean value of said reflex amplitude, is larger than a predefined value.

Alternatively, the space frequency content of a periodically varying reflex amplitude is analyzed and said object classified as an overhead object if the content of space frequencies higher than a predefined space frequency is larger than a predefined value.

In this content, it is understood that the terms period, frequency, and so on, refer to the variations in said amplitude as expressed in spatial terms (i.e. with respect to the distance between the vehicle and the object).

In another embodiment, the different embodiments and alternatives described above is combined into one single process, wherein the different embodiments cooperate with each other based upon which embodiments that provide the most reliable result at different distance intervals.

As is understood, the method described above is preferably realized using state of the art electronic circuits and/or programmable processors, such devises incorporating the method of course residing within the scope of the invention. A great advantage of the invention is that the provision of a software solution will significangly reduce costs as compared to hardware solutions of solving the above mentioned problem.

Also, it is understood that the fact that an object is classified as an overhead object or a ground level object does not automatically mean that the radar, vehicle or driver immediately is supposed to act upon such a classification. A vehicle radar system using the invention will generally include decision rules stating for example within which distance intervals that a decision shall or may be made, said distance intervals generally being related to the speed of the vehicle and the relative speed of the object, which degree of certainty that is needed for a classification to be regarded as confirmed, and so on.

BRIEF DESCRIPTION OF THE DRAWINGS

Exemplifying embodiments of the invention will now be described with reference to the accompanying drawings, wherein.

DETAILED DESCRIPTION OF PREFERRED EMBODIMENTS

Figure 1A:
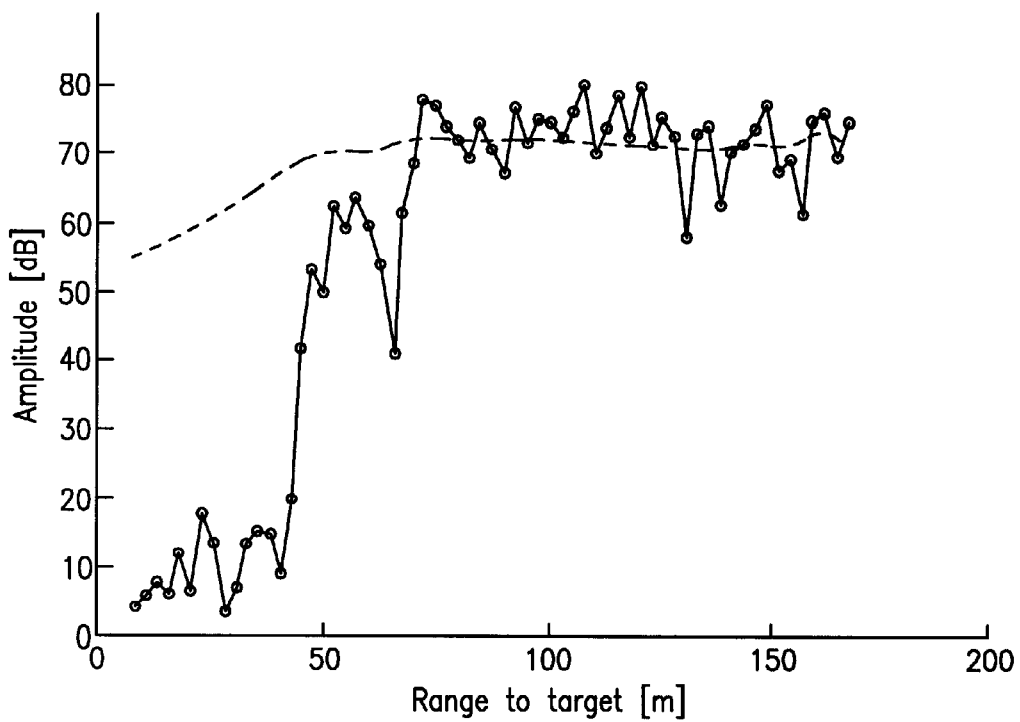
FIGS. 1a, 1b, and 1c are diagrams showing the relationship between the amplitude of a radar reflex from an object in front of a vehicle and the distance thereto.
Figure 1B:
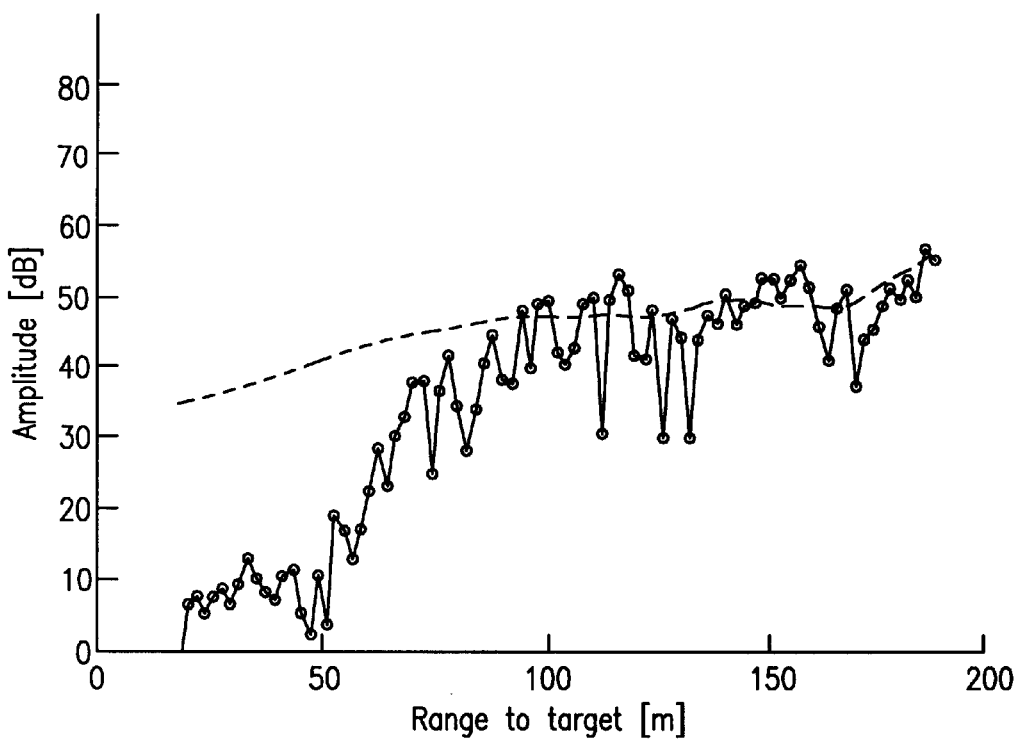
Figure 1C:
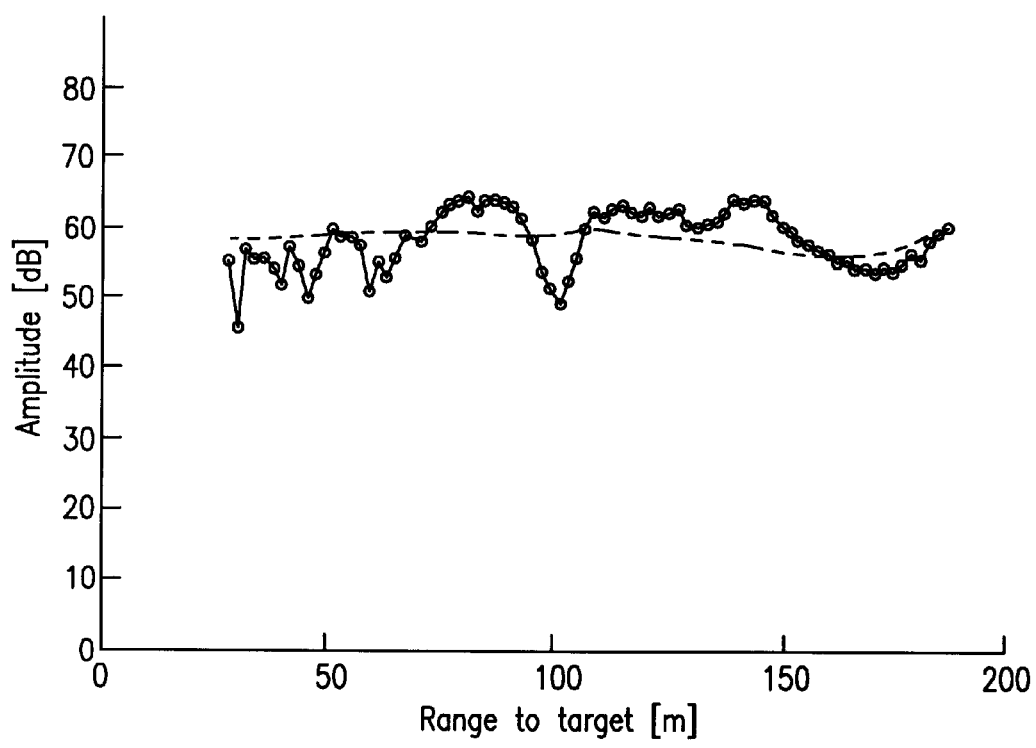

FIGS. 1a, 1b, and 1c show the amplitude of a signal reflex received by a vehicle mounted radar from an object in front of the vehicle as a function of the distance to said object (or "target"), as the distance to said object decreases from approximately 150–200 meters to approximately 10–30 meters. In FIGS. 1a and 1b, the reflecting objects are overhead road bridges, and in FIG. 1c, the reflecting object is a (stationary) row of cars located in front of the vehicle and in the same lane and level as the vehicle. In all three figures, the solid line indicates maximal reflex amplitude for each scan (one scan for each circular dot), and the dashed line indicate the average value of all reflexes received so far (i.e. the average of all scans received so far). As is clear, in the case of the overhead bridges in FIGS. 1a and 1b, the received reflex amplitude drops essentially as the distance to the object decreases below 40–80 meters, whereas in the case of the row of cars in FIG. 1c, the received reflex amplitude is maintained at an essentially unchanged level. (This features are also evident from the examples of FIGS. 3a and 3b to be discussed below. As will be described below with reference to FIG. 4, this difference in the amplitude behavior is used according to the invention to distinguish overhead objects from ground level objects.

Figure 2A:
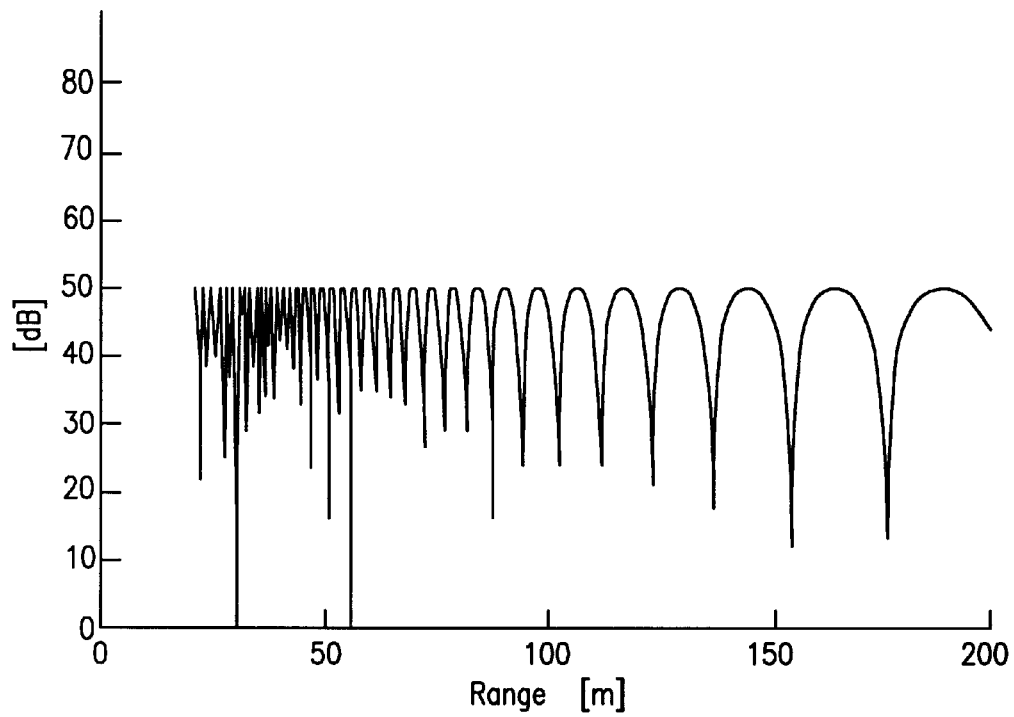
FIGS. 2a and 2b are diagrams showing the theoretical relationship between the amplitude of radar reflex from an object in front of a vehicle and the distance thereto.
Figure 2B:
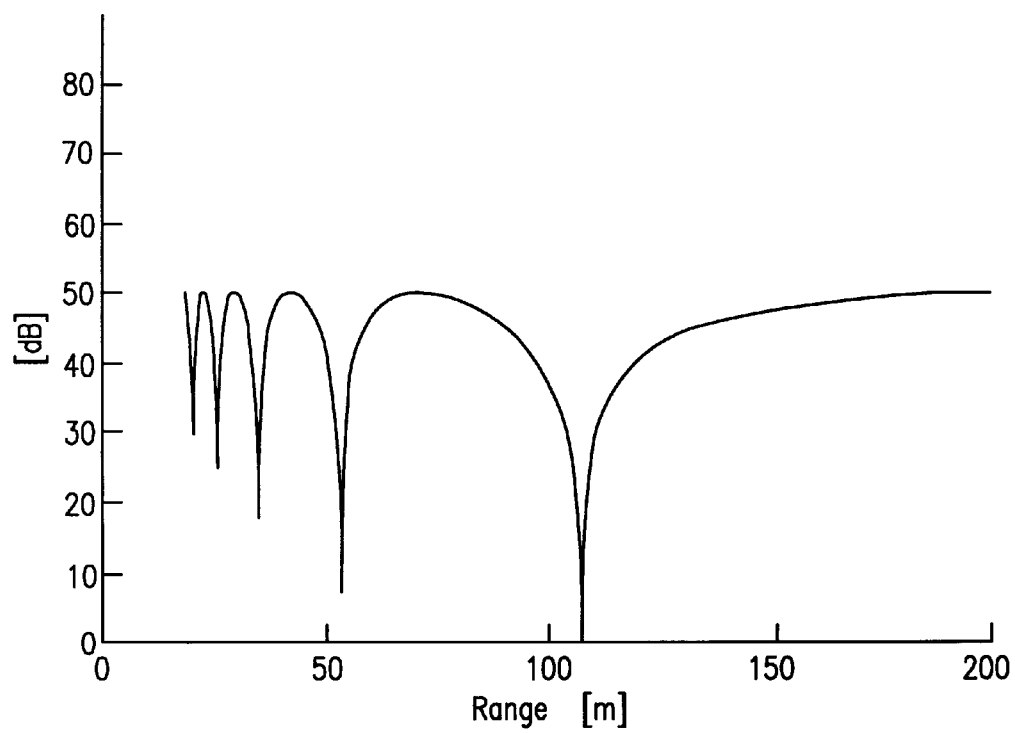
Figure 3A:
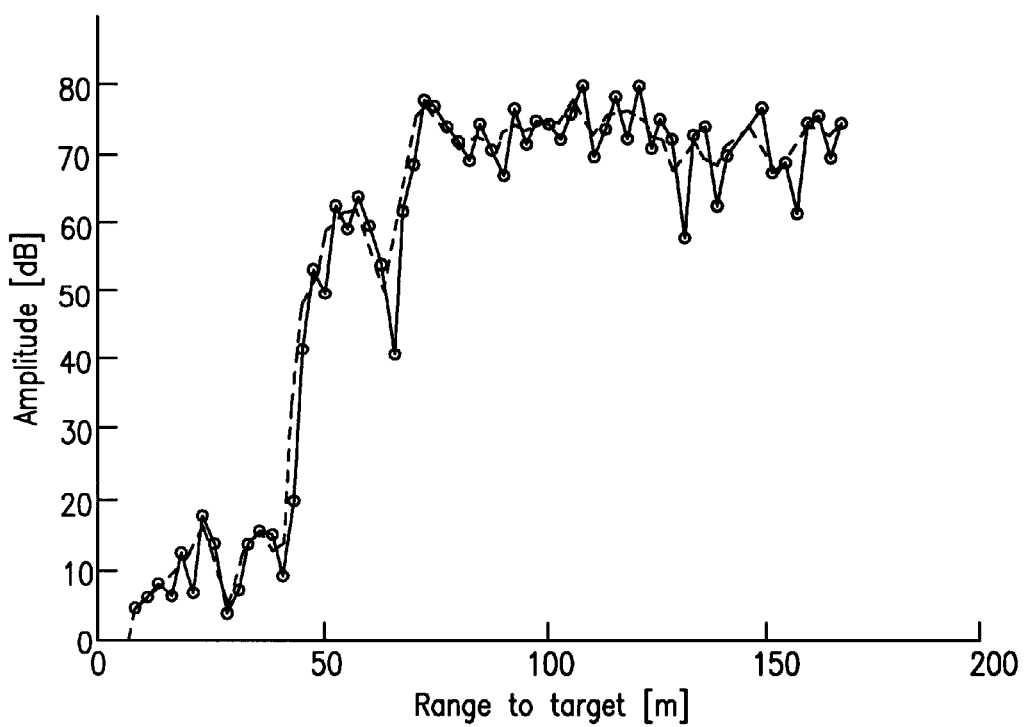
FIGS. 3a and 3b are diagrams showing the relationship between the amplitude of a radar reflex from an object in front of a vehicle and the distance thereto.
Figure 3B:
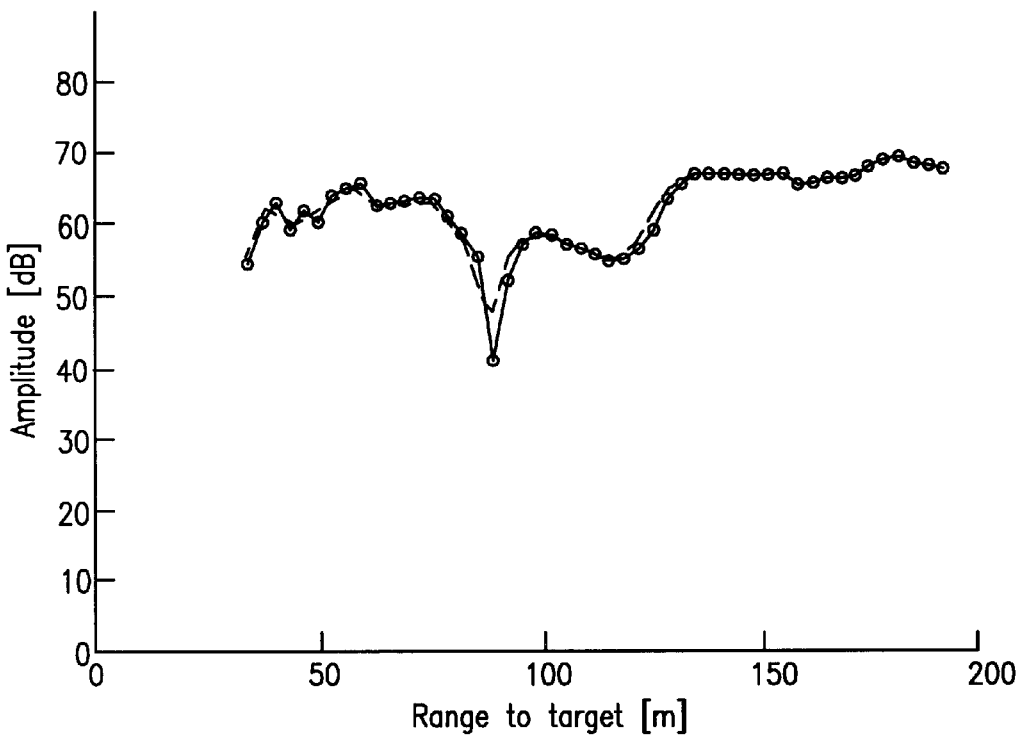

FIGS. 2a and 2b show the theoretically derived amplitude of a signal reflex received by a vehicle mounted radar from an object in front of the vehicle as a function of the distance to said object (or "target"), as the distance to said object decreases from approximately 150–200 meters to approximately 10–30 meters. FIGS. 3a and 3b show corresponding diagrams illustrating actual measurements. In FIGS. 2a and 3c, the reflecting object is an overhead road bridge, whereas in FIGS. 2b and 3b, the reflecting object is a (stationary) now of cars located in front of the vehicle and in the same lane and level as the vehicle. Also, in FIGS. 2a and 2b, the received amplitude has been normalized using the mean amplitude thereof. In both FIGS. 2a and 2b, the vehicle mounted radar is assumed to be mounted 0.3 meters above the road surface. In FIG. 2a, the object (overhead road bridge) is assumed to be located 4 meters above the road surface, and in FIG. 2b, the object (ground level car) is assumed to be located 0.65 meters above the road surface. As is clear, in the case of the overhead road bridge of FIGS. 2a and 3a, the received reflex amplitude show a periodicity (in distance) which is shorter than the periodicity in the case of the ground level obstacle in FIGS. 2b and 3b. (These features are also evident from the examples of FIGS. 1a, 1b, and 1c discussed above). Also, in both cases, the period decreases as the distance between the vehicle and the object decreases. However, within a specific distance range, the difference in periodicity is sufficient to distinguish one case from the other. As will be described below with reference to FIG. 5, this difference in the amplitude behavior is used according to the invention to distinguish overhead objects from ground level objects.

Figure 4:
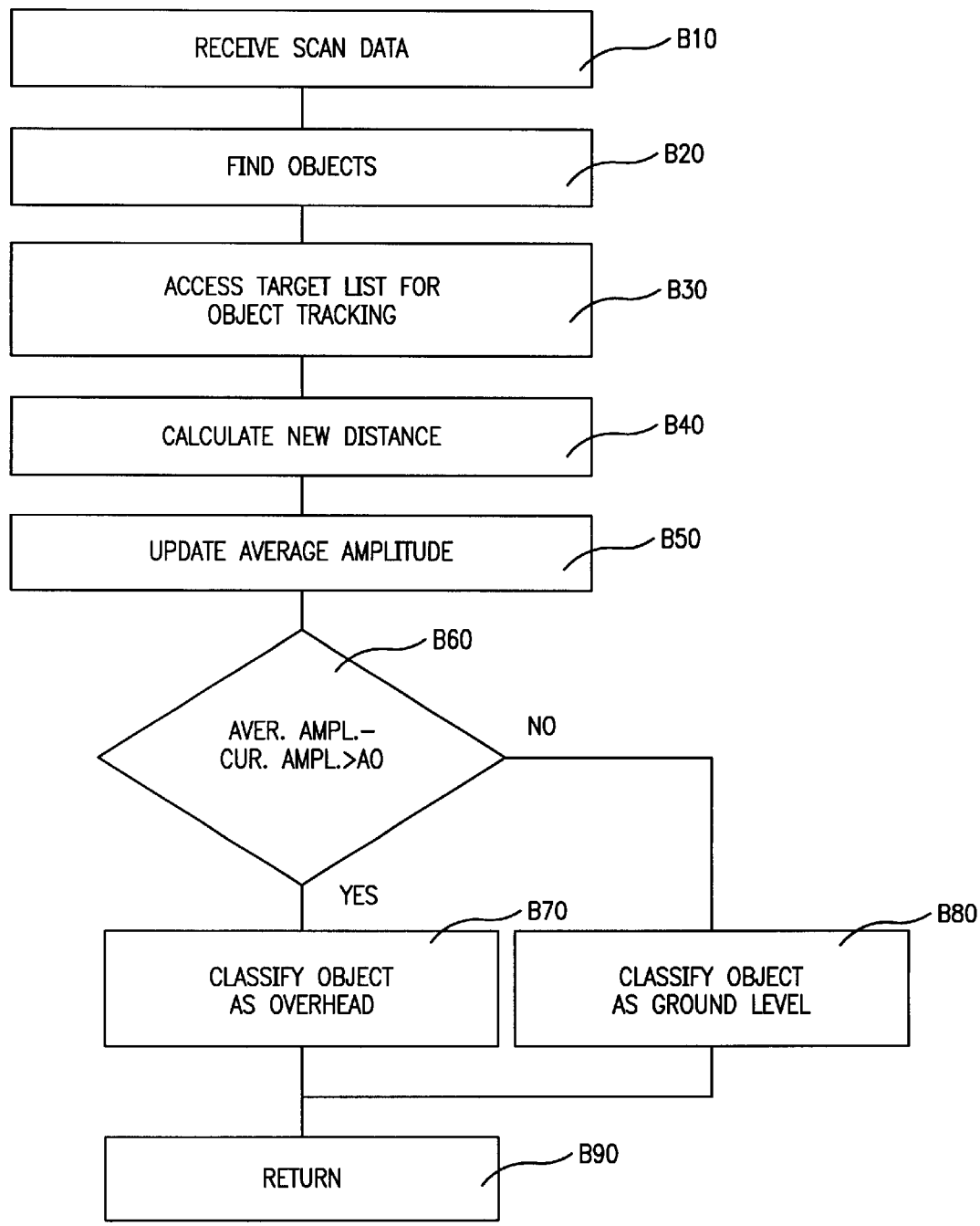
FIG. 4 is a flow shart exemplifying a first embodiment of the invention.

FIG. 4 schematically shows a flow chart describing an operation according to said first embodiment of the invention. For each horizontal scan of the vehicle mounted radar, scan data are received in an initial step B10. Based upon the received scan data, one or more objects are identified in step B20. The following steps are then performed for each of said identified objects. In step B30, a so called target list, which is used for storing data related to objects detected in previous scans, such as the distance to a previously detected object, the angle to said previously detected object, the relative speed thereof, and a classification thereof, is accessed for determining if the present object of the current scan correspond to an object in the previous scan in order to establish object tracking. Then, in step B40 the new distance to said object is calculated based upon the new scan data and used to update the target list. According to this embodiment, the target list will also include, for each tracked object, a value representing the average amplitude, i.e. the mean amplitude value of all preceding scans. Using the iterative relationship, the stored average amplitude value is updated in step B50 based upon the latest reflex amplitude. Then, in step B60, it is decided whether of not the difference between the average amplitude and the latest reflex amplitude is larger than a predefined amplitude drop $A_0$, for example 17 dB (with reference to FIGS. 1a to 1c). If so, i.e. if the difference is larger than $A_0$, the object is for now classified as an overhead object in step B70. However, if the difference is smaller than $A_0$, the object is classified for now in step B80 as a ground level object. The operation then returns via step B90 to step B10 to process data of the next scan.

Figure 5:
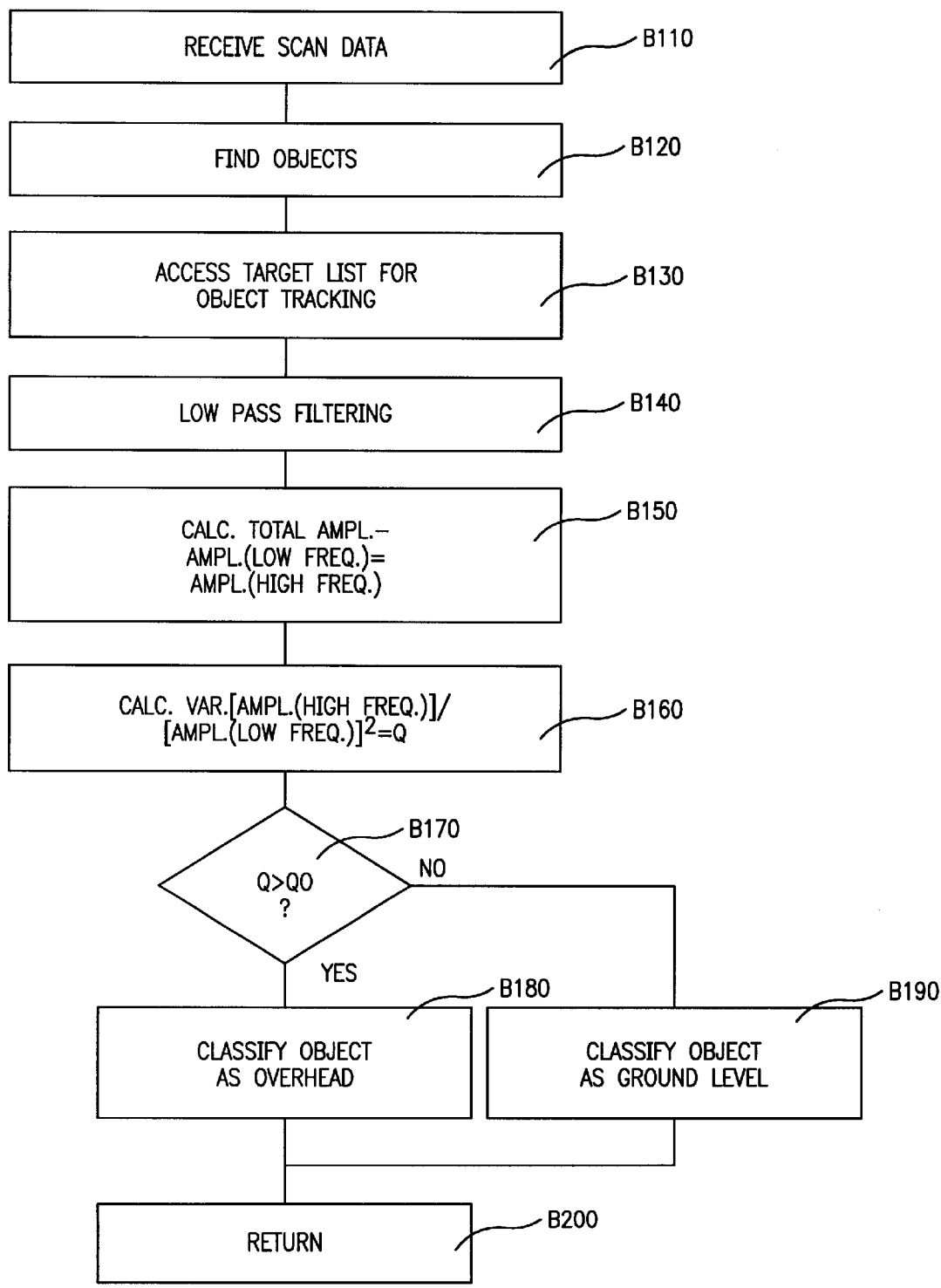
FIG. 5 is a flow shart exemplifying a second embodiment of the invention.

FIG. 5 schematically shows a flow chart describing an operation according to said second embodiment of the invention. In similar to the operation shown in FIG. 4, for each horizontal scan of the vehicle mounted radar, scan data are received in an initial step B110. Based upon the received scan data, one or more objects are identified in step B120. In step B130, the target list is accessed in order to established object tracking. The following steps are then performed for each of said identified objects.

Then, in steps B140, B150 and B160, a value Q is calculated in the following manner. First, the spatially periodically varying amplitude is low pass filtered in step B140 using a cut-off space frequency (expressed in $m^{-1}$), which preferably is a function of the distance to the object. (The smaller the distance between the vehicle and the object, the larger cut-off frequency.) In step B150, the high frequency signal amplitude (i.e. a signal only incorporating the high frequency components of the received amplitude) is derived by calculating the difference between the total signal (which includes all frequencies) and the low pass filtered signal (which only includes low frequencies). Then, in step B160, a decision value Q is calculated as the variance of the high frequency signal scaled by the square of the mean value of the overall signal (in this case as represented by the low filtered signal). Hence, as a decision variable, the variance of any present high frequency components normalized by the square of the mean amplitude is used. As is understood by one skilled in the art, the steps B140, B150 and B160 described above are preferably realized using an iterative relationship, thus avoiding the need of storing unnecessary historical data for each of the detected objects, and the target list will thus include the necessary iterative variables for each object. Also, said filtering and averaging may be confined to a adjustable distance interval using some kind of processing window.

If the thus derived decision variable, Q, exceeds a predefined value, the decision "overhead object" is made in step B190. Otherwise, the object is classified as a ground level object in step B190. The operation then returns via step B200 to step B110 to process data of the next scan.

In the embodiment described above, whether of not the operation will actually act on said classifications to alert the driver, change the vehicle speed, or the like, will depend on the current distance to said object, the speed of the vehicle, the established degree of certainty, and similar considerations. Thus a mere classification for one single scan does not necessarily mean that any corresponding action is taken at that moment.

What is claimed is:

1. A method for classifying objects detected by a vehicle mounted radar located in front of said vehicle for transmitting a radar microwave signal and for receiving reflections thereof from objects positioned in front of said vehicle, said method comprising the steps of:

tracking a radar reflection from an object located in front of said vehicle as a calculated distance from said vehicle to said object, as derived based upon a time of flight of said radar reflection, decreases;

monitoring changes in an amplitude of said radar reflection from said object as said calculated distance from said vehicle to said object decreases; and classifying said object as an overhead object or a ground level object based upon said changes in the radar reflection amplitude.

2. The method of claim 1, wherein said classifying step includes classifying said object as an overhead object if a decrease in the monitored amplitude as the distance between said vehicle and said object decreases is larger than a threshold amplitude drop.

3. Method as claimed in claim 1, wherein said classifying step includes classifying said object as an overhead object if a difference between an averaged amplitude value, as averaged during a decrease in the distance between said vehicle and said object, and a currently received reflection amplitude is larger than a threshold amplitude difference.

4. Method as claimed in claim 1, wherein said monitoring step comprises monitoring a periodic variation in the amplitude of said radar reflection from said object during a decrease in the distance between said vehicle and said object, said periodic variation resulting from a multipath effect of said reflection, and wherein said classifying step comprises classifying said object as an overhead object or a ground level object based upon a periodic behavior of said periodic variation.

5. Method as claimed in claim 4, further comprising:

analyzing a space frequency content or said periodically varying reflection amplitude; and classifying said object as an overhead object if a content of space frequencies higher than a threshold space frequency is larger than a threshold content value.

6. Method as claimed in claim 5, wherein said threshold space frequency has a value which increases with decreasing distance between said vehicle and said object.

7. Method as claimed in claim 4, wherein said classifying step includes classifying said object as an overhead object if a space periodicity of said periodic variation is smaller than a threshold space periodicity.

8. Method as claimed in claim 7, wherein said threshold space periodicity has a value which decreases with decreasing distance between said vehicle and said object.

9. Method as claimed in claim 4, wherein said classifying step includes classifying said object as an overhead object if a normalized amplitude variance of said received reflection amplitude is larger than a threshold value.

10. A device used in a vehicle mounted radar for transmitting a radar microwave signal and for receiving a reflected signal from at least one object positioned in front of said vehicle, comprising:

means for tracking a microwave radar reflection from said at least one object;

means for monitoring changes in an amplitude of said reflected signal; and means for classifying said at least one object as either an overhead object or a ground level object based on said changes in the amplitude of said reflected signal.

11. The device of claim 10, wherein said means for tracking tracks the microwave radar reflection as the calculated distance from said vehicle to said at least one object decreases.

12. The device of claim 10, wherein said means for calculating calculates the distance based on a time of flight of said reflected signal.

13. The method of claim 9, wherein said normalized amplitude is normalized using a mean value of said reflection amplitude.

* * * * *